United States Patent [19]

Shiozawa et al.

[11] Patent Number: 4,566,774
[45] Date of Patent: Jan. 28, 1986

[54] AUTOMATIC EXPOSURE CAMERA

[75] Inventors: Kazuo Shiozawa; Kijiro Suzuki, both of Hachioji, Japan

[73] Assignee: Konishiroku Photo Industry Co., Ltd., Tokyo, Japan

[21] Appl. No.: 611,377

[22] Filed: May 17, 1984

Related U.S. Application Data

[63] Continuation-in-part of Ser. No. 484,296, Apr. 15, 1983, abandoned, which is a continuation of Ser. No. 267,389, May 26, 1981, abandoned.

[30] Foreign Application Priority Data

May 27, 1980 [JP] Japan ................... 55-70603

[51] Int. Cl.$^4$ ............................................ G03B 17/18
[52] U.S. Cl. .................... 354/413; 354/446; 354/471; 354/474
[58] Field of Search ................. 354/51, 441, 442, 444, 354/445, 446, 447, 449, 450, 451, 452, 471, 473, 474, 475, 413, 459, 460

[56] References Cited

U.S. PATENT DOCUMENTS 4,264,164 4/1981 Motoori et al. ................. 354/459
4,290,674 9/1981 Kobori et al. ................. 354/474

Primary Examiner—Russell E. Adams
Attorney, Agent, or Firm—Jordan B. Bierman

[57] ABSTRACT

The present invention generally concerns an automatic exposure camera and, more particularly, one incorporating a so-called AE locking device or circuit. In such a camera, the proper or optimum exposure values are automatically determined by electronic circuitry and the exposure operation is controlled in accordance with that determination. In addition, the control circuitry by which the exposure operation is accomplished is "locked" during the exposure so as to hold—as in a memory device—the proper exposure values determined immediately prior to the exposure operation by automatically actuating the AE locking device. The present invention provides for connection between the AE locking circuit and the warning device so as to inhibit the output of the warning device—and prevent an erroneous indication by the indicating unit—on actuation of the AE locking circuit. In the absence of this particularly advantageous feature, the "low light" indicator would likely be actuated each time an exposure was carried out as the return mirror in the camera was upwardly pivotted. Other erroneous indications would similarly occur when the AE locking circuit was selectively used to retain an exposure determination for a subsequent photographing operation.

2 Claims, 3 Drawing Figures

AUTOMATIC EXPOSURE CAMERA

This application is a continuation-in-part of application Ser. No. 484,296, filed Apr. 15, 1983, which was a continuation of application Ser. No. 267,389, filed May 26, 1981, both now abandoned.

BACKGROUND OF THE INVENTION

1. Field of the Invention

The present invention relates to the automatic exposure camera and more particularly to the improvement of the automatic exposure camera having an AE locking device.

2. Description of the Prior Art

Some of the cameras having a photometry storage function are equipped with an AE locking function wherein a certain point in the field is measured photometrically before the exposure with the use of the storage device thereof and the value obtained therefrom is locked. And the AE locking function is effective in particular when a proper exposure can not be obtained for the automatic exposure made without any adjustment in the case of a subject with the sky for a background or in the case of a subject that is in the condition of the backlight. When a camera is set at the photographing position with a storage of a certain photometric value, the photometric value for the photographing position set is different from the photometric value stored previously. Accordingly, in the case the output of the storage circuit is not used as a photometric value for the warning or the indication, the warning or the indication differs from the aperture value and the shutter speed with which the photographing is actually made and thereby the warning that tells the outside of the proper range may be made, which is inconvenient. Further, during the period of the AE locking operation, other photographing information may be inputted, which contradicts logically.

SUMMARY OF THE INVENTION

The object of the present invention is to prevent the erroneous operation and the erroneous judgment of the user and to offer the automatic exposure camera characterized in that the construction is made so that the read in of the input information for photographing and/or the change of the photographing indication information are impossible during the period of the operation of said AE locking device in an automatic exposure camera having an AE locking device.

DETAILED DESCRIPTION OF THE PREFERRED EMBODIMENTS

Figure 1:
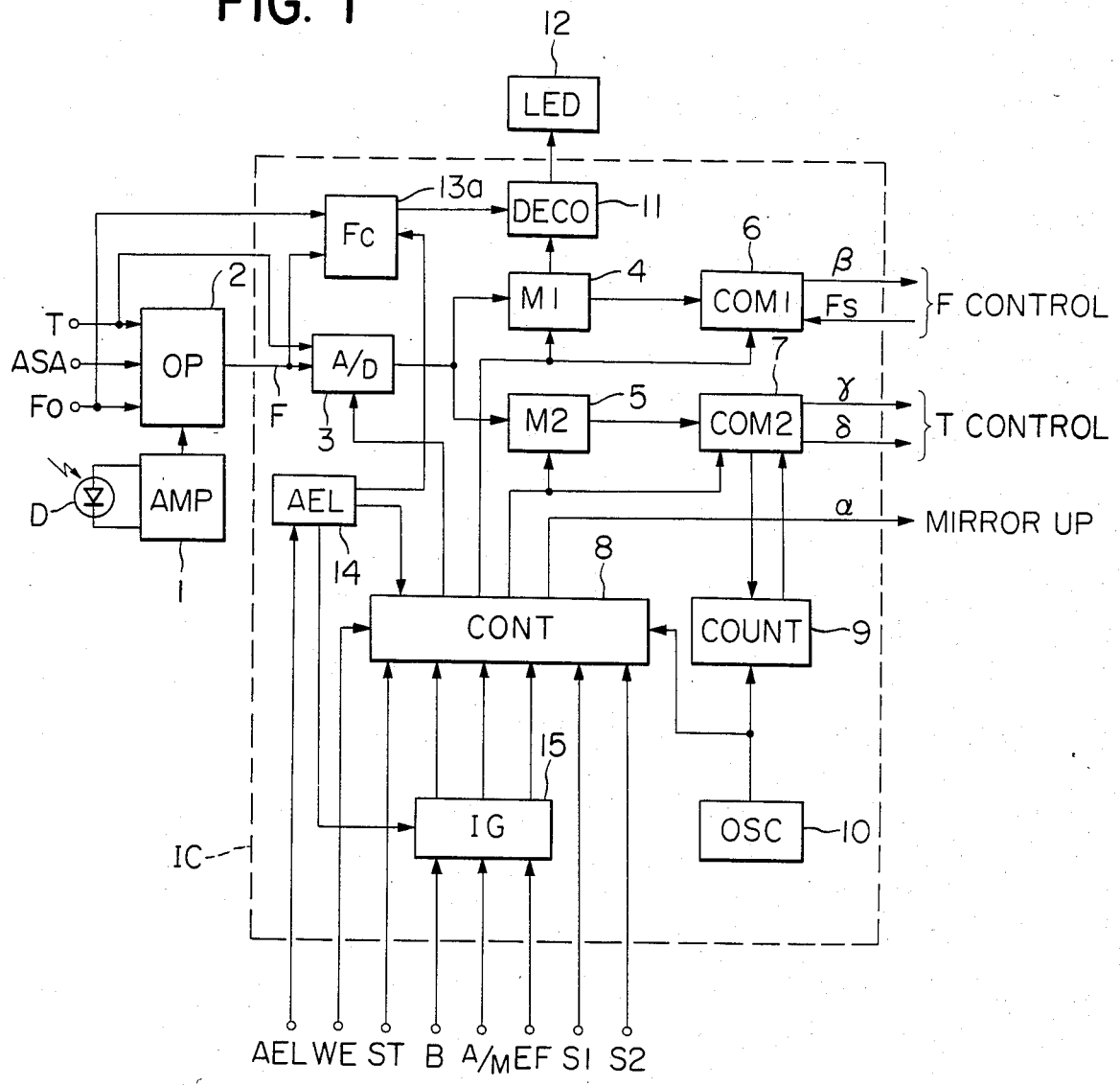
FIG. 1 and FIG. 2 are block diagrams both showing examples of the present invention.

The present invention will be described concretely as follows according to examples. FIG. 1 is a block diagram of the camera control system showing an example of the present invention. The numeral 1 is a logarithmic amplifier that amplifies the photometric values converted to the electrical signals by a photo-diode D.

The numeral 2 is an operational amplifier and it computes the optimum aperture value based upon the shutter speed (T) information, the film speed (ASA) information, open aperture F value (Fo) information of a camera lens and photometric information which are all converted into the voltage values.

The numeral 3 is an A/D converter that converts the input of the optimum aperture value (f) that is an output of aforesaid computing and the shutter speed (T) information into digital signals. There is no limitation for conversion signals in particular and in this example, 7-bit parallel signals are used.

In the present example, aforesaid two kinds of analogue values are converted into digital values respectively through one set of A/D converter for simplification of the system. Therefore, aforesaid A/D converter 3 has analogue switches for the shutter speed (T) information and the optimum aperture value from the operational amplifier 2 which are not illustrated. The control circuit 8 drives A/D converter 3, memory circuits 4 and 5 in a time sharing manner.

Namely, at the first timing, the first analogue switch (not illustrated) is opened, and, for example, the optimum aperture value from the operational amplifier 2 is converted into the 7-bit digital signal through the A/D converter 3 and this converted signal is set in the memory circuit 4. At the second timing, the second analogue switch (not illustrated) is opened and the shutter speed (T) value is converted into the digital signal through the A/D converter and this converted signal is set in the memory circuit 5. The optimum aperture value (F) stored in the memory circuit 4 is converted to the indication signal by the decoder circuit 11 and then is indicated by the indication unit 12.

The numeral 6 is an aperture mechanism control circuit. This circuit 6 is equipped with an output line $\beta$ and an input line (FS). The output line ($\beta$) is connected to the aperture driving device and the input line (FS) is connected to the aperture detecting device in the aperture mechanism. The aperture driving device conducts a stopping action corresponding to the length of the time of pulse signal generated on the output line ($\beta$) and the detecting device generates the pulse signals in number corresponding to the change of aperture value in the aperture mechanism.

The aperture mechanism control circuit 6 includes the digital comparator and the counter. This digital comparator compares the digital signal that shows the optimum aperture value from the memory circuit 4 with the digital signal from aforesaid counter. The pulse signals (FS) from the detecting device of the aperture mechanism are supplied to the aforesaid counter circuit. Accordingly, the digital comparator generates the output signals for the aperture driving device on the output line ($\beta$) from the starting point up to the time when the contents of aforesaid memory circuit 4 coincide with the contents of the counter. In response to the output signals an aperture control solenoid (not shown) operates. Consequently, at the time of discontinuation of signals on the output line ($\beta$), the aperture mechanism is controlled to its optimum aperture value.

The numeral 7 is a shutter mechanism control circuit and is equipped with the output lines ($\gamma$) and ($\delta$). The pulse signal in the output line ($\gamma$) starts the front curtain of the focal-plane shutter and the output line $\delta$ starts the rear curtain. This shutter mechanism control circuit 7 is equipped with a digital comparator (not illustrated). The digital comparator compares the output of the memory circuit 5 in which the shutter opening time (T) is inputted with the output of the counter 9. The counter 9 is set by the reset signal from the control circuit 8 prior to the signal γ for starting the front curtain. This control circuit 7 first generates the signal for starting the front curtain on the output line (γ) with the aid of the control signal from the control circuit 8 and when it becomes the same as the signal of the counter 9 at the same time, the output of the digital comparator becomes 1 and consequently, the signal for starting the rear curtain is generated on the output line (δ). In response to the signal generated on the output line (γ) and the signal generated on the output line (δ), a shutter front curtain solenoid and a shutter rear curtain solenoid operates respectively.

The numeral 10 is an oscillator and it forms the standard pulse and clock pulse etc. for aforesaid shutter control, aperture control, integral type A/D conversion circuit 3 and control circuit 8 etc.

The numeral 9 is a counter and it receives the standard pulse formed by aforesaid oscillator 10 and forms the pulse etc. for a certain period of time.

The control circuit 8 controls aforesaid each circuit block with an input such as an automatic/manual switching signal (A/M), flash signal (EF), bulb signal (B), release signal (S1, S2), signal for completion of winding (WE) and self-timer signal (ST) etc.

The numeral 13a is an exposure warning circuit and it compares the optimum aperture value (F) with an open aperture F value (Fo) and if the open aperture F value (Fo) is larger, it gives out the low brightness warning signal and if the optimum aperture value (F) is larger than F22, for example, it gives out the high brightness warning signal and sends them to the decoder circuit 11 and thereby the warnings are made on the indication device 12 respectively in the fixed indication form.

The numeral 14 is an AE locking circuit and it sends signals to each block when AEL signals are inputted by the outer switch (not illustrated) and sets them in the AE locking state.

The numeral 15 is an input signal gate circuit and it includes flip-flop etc. and by the clock signal, it transfers to the control circuit 8 the signals for establishing photographing modes such as automatic/manual switching signal (A/M), flash signal (EF) and bulb signal (B) etc. If AE locking signals are set on the AE locking circuit 14, the sending out of the brightness warning signals from the exposure warning circuit 13a to the decoder circuit 11 is prohibited. Further, the impression of the clock pulse to the input signal gate circuit 15 is also prohibited and the output of the input signal gate circuit 15 is held in the state that AE locking is set.

Figure 3:
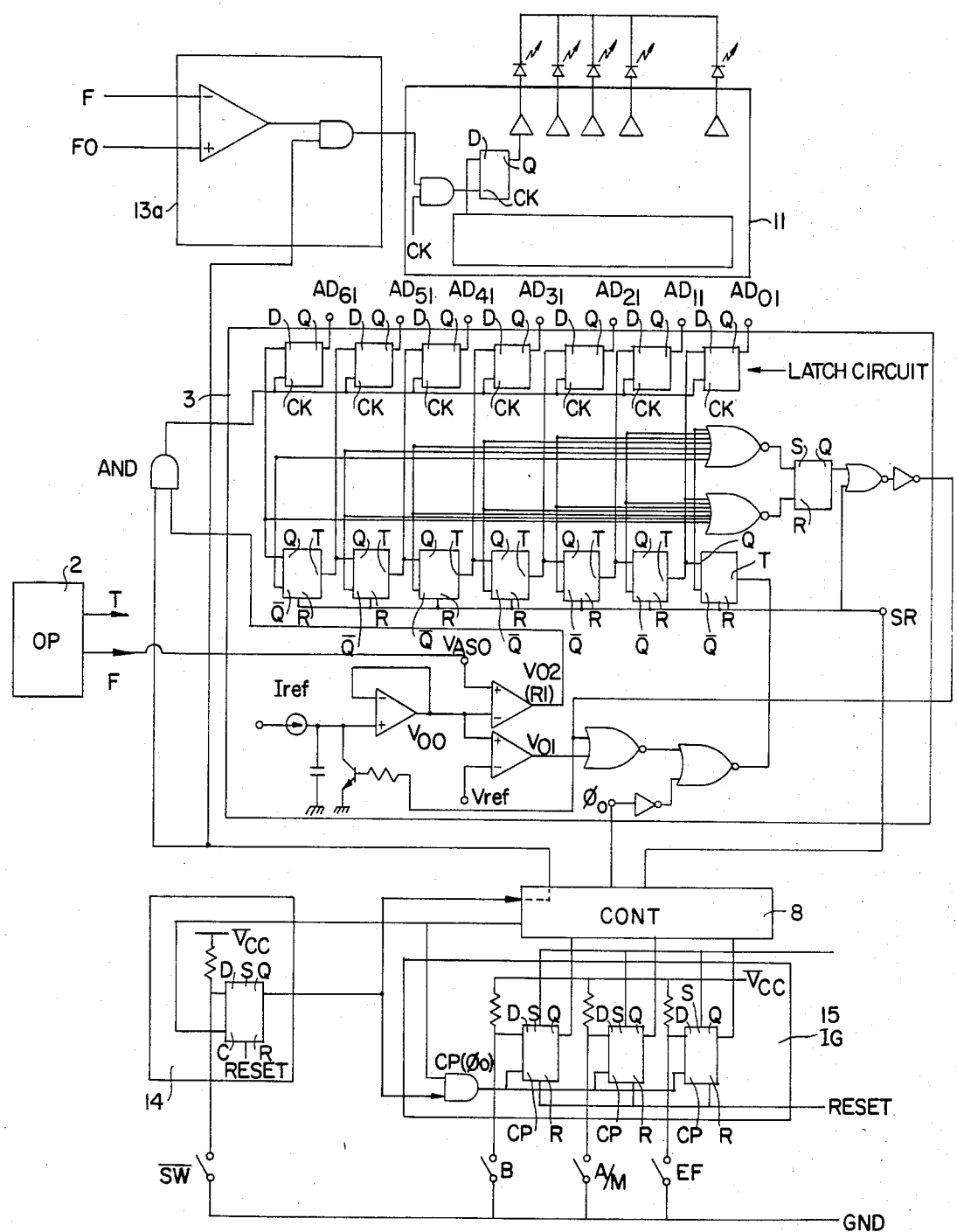
FIG. 3 is a diagram showing the details of the A/D converter 3 shown in FIGS. 1 and 2.

FIG. 3 is a block diagram showing the details of A/D conversion circuit 3, the AE locking device 14, circuit 13a, input signal gate circuit 15 and the decoder circuit 11, and the relationship of them those are shown in FIG. 1. But in FIG. 3, a circuit to generate high brightness warning signal is omitted.

The present example will be explained more precisely referring to FIG. 3.

Clock pulses are fed to clock pulse input terminal CP of D flip-flop in AE locking circuit 14 from control circuit 8. When AEL signals are inputted by the outer switch SW, low signal 0 is fed to D terminal of D flipflop in AE locking circuit 14 and low signal 0 is generated from Q terminal of D flip-flop. The low signal 0 from Q terminal is sent to circuit 13a and A/D conversion circuit 3 through control circuit 8. Therefore the sending out of the brightness warning signals from the exposure warning circuit 13a to the decoder circuit 11 is prohibited because of the input of low signal 0 to AND gate circuit in circuit 13a. The low signal 0 from control circuit 8, which is sent to A/D conversion circuit 3 and represents AE locking state, is fed to input terminal of AND gate circuit which controls feed of clock pulses to clock pulse input terminal CK of each D flip-flop forming latch circuit. Therefore, during the period of AE locking, clock pulses are not fed to clock pulse input terminal CK and the optimum aperture value (F) can not be changed. And the optimum aperture value (F) is kept as it was when setting AE locking.

When AEL signals are inputted, low signal 0 from AE locking circuit 14 is fed also to AND gate circuit in input signal gate circuit 15. Then the AND gate circuit prohibits feeding of clock pulses from control circuit 8 to clock pulse input terminal of each D flip-flop in input signal gate circuit 15. Accordingly the output of the input signal gate circuit 15 is held in the state that AE locking is set.

Consequently, the change of signals for photographing mode is not made during the period of AE locking and the change of indication and the warning caused by the change of photographing mode are not made.

In the aforesaid example, the camera control system of aperture control with shutter speed-priority is stated and similarly the camera control system of shutter speed control with aperture-priority of the camera control system of program type is effected.

Figure 2:
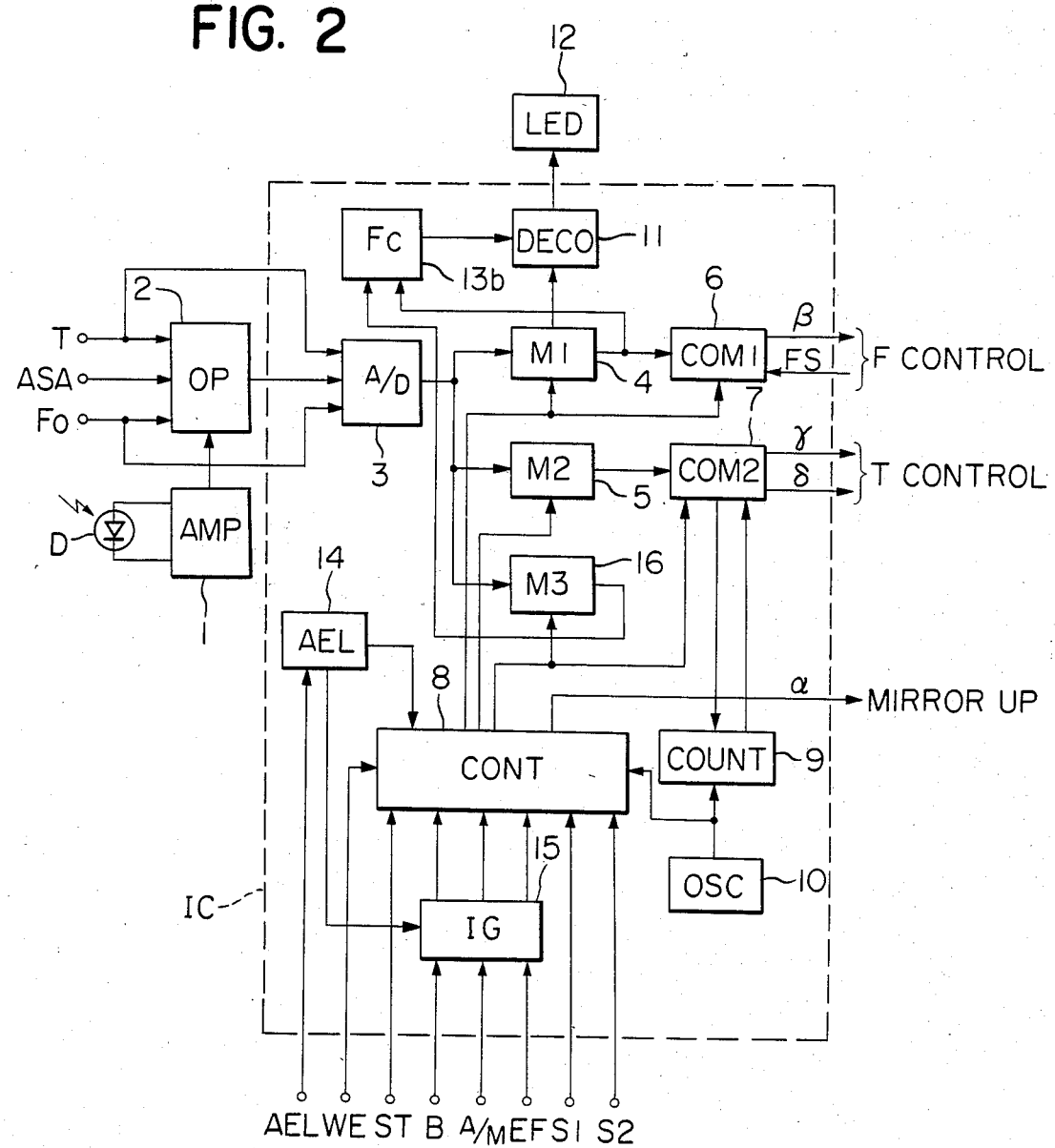

FIG. 2 is a block diagram of the camera control system that shows other example of the present invention.

The point that is different from the first example is that at the A/D converter 3,3 values of shutter opening time (T), optimum aperture value (F) and open aperture F value (Fo) are A/D converted and an open aperture F value (Fo) is set in the newly established memory circuit 16. And 13a is an analogue comparator in the first example but 13b in the present example is a digital comparator and the constitution is made so that the optimum aperture value (F) turned to digital mode in the state of AE locking is compared with the open aperture F value (Fo) turned to digital mode in the same manner and the indication and warning under AE locking are made by the indication device 12 through the decoder circuit 11.

In both examples, it was effective to prevent the erroneous operation and the erroneous judgment of the user by the constitution wherein the read in of the input information for photographing and/or the change of the photographing indication information are impossible during the period of the operation of the AE locking device.

What is claimed is:

1. In an automatic exposure camera which includes a lens having an open aperture value associated therewith, means for detecting the brightness of light reflected from a subject to be photographed and for generating an optimum aperture value for the photographing operation in accordance therewith, a circuit for controlling the photographing operation in accordance with the optimum aperture value generated by said means and having a plurality of inputs thereto, and an AE locking circuit actuatable prior to a photographing operation to cause said circuit to control a subsequent photographing operation in accordance with the optimum aperture value generated by said means on actuation of said AE locking circuit by causing said control circuit to be blocked against responding to changes in the plural inputs thereto subsequent to actuation of said AE locking circuit and until completion of a subsequent photographing operation, the improvement comprising:
  warning means for comparing at least the optimum aperture value and the open aperture value and for outputting a warning signal in accordance with said comparison when the detected light reflected from the subject is either too low or too bright for automatic exposure photography,
  said AE locking circuit being connected to said warning means to inhibit the outputting of said warning signal when the AE locking circuit is actuated so as to thereby prevent presentation of a false light level warning during use of the AE locking circuit.

2. In an automatic exposure camera in accordance with claim 1, said plural inputs to the control circuit including inputs indicative of user-specified operating modes, said user-operating modes including a self-timing shutter release feature, a flash exposure feature, and switching between automatic and manual operating modes, whereby the control circuit is rendered unresponsive to changes in said user-specified operating modes on actuation of the AE locking circuit.

* * * * *